(12) United States Patent
Rufenacht

(10) Patent No.: US 8,587,326 B2
(45) Date of Patent: Nov. 19, 2013

(54) METHOD FOR ENERGY-SAVING OPERATION OF A MAGNETO-INDUCTIVE FLOW MEASURING DEVICE

(75) Inventor: Markus Rufenacht, Dornach (CH)

(73) Assignee: Endress + Hauser Flowtec AG, Reinach (CH)

( * ) Notice: Subject to any disclaimer, the term of this patent is extended or adjusted under 35 U.S.C. 154(b) by 294 days.

(21) Appl. No.: 13/123,750

(22) PCT Filed: Sep. 18, 2009

(86) PCT No.: PCT/EP2009/062087
§ 371 (c)(1),
(2), (4) Date: Apr. 12, 2011

(87) PCT Pub. No.: WO2010/043467
PCT Pub. Date: Apr. 22, 2010

(65) Prior Publication Data
US 2011/0267076 A1    Nov. 3, 2011

(30) Foreign Application Priority Data
Oct. 13, 2008    (DE) .................. 10 2008 051 034

(51) Int. Cl.
*G01R 27/28*    (2006.01)
*H03B 1/00*    (2006.01)

(52) U.S. Cl.
USPC ........... 324/654; 324/656; 324/600; 324/713; 327/110; 327/102

(58) Field of Classification Search
None
See application file for complete search history.

(56) References Cited

U.S. PATENT DOCUMENTS

| | | | |
|---|---|---|---|
| 4,766,770 A | 8/1988 | Mannherz | |
| 5,621,177 A * | 4/1997 | Torimaru | .................. 73/861.16 |
| 6,453,755 B1 | 9/2002 | Brockhaus | |
| 8,222,888 B2 * | 7/2012 | David et al. | .............. 324/207.13 |

(Continued)

FOREIGN PATENT DOCUMENTS

| | | |
|---|---|---|
| DE | 102 14 323 C1 | 8/2003 |
| DE | 103 45 297 A1 | 5/2005 |
| DE | 10 2004 002 546 A1 | 8/2005 |
| DE | 10 2005 018 179 A1 | 10/2006 |

(Continued)

OTHER PUBLICATIONS

International Search Report and the German Search Report.

*Primary Examiner* — Jermele M Hollington
*Assistant Examiner* — Trung Nguyen
(74) *Attorney, Agent, or Firm* — Bacon & Thomas, PLLC

(57) ABSTRACT

A method for operating a magneto-inductive flow measuring device having a measuring tube, wherein an at least partially electrically-conductive measured material flows through the measuring tube. For determining flow, there is produced by means of at least one coil arrangement a clocked magnetic field, which at least partially passes through the measured material, wherein the magnetic field is produced by an exciter current, which flows through the coil arrangement. The magnetic field is operated with at least a first clocking, wherein, in a case in which the coil arrangement is free of exciter current, an electrical potential difference is sensed between the measured material and a reference potential by means of at least a first measuring electrode communicating with the measured material. The potential difference is compared with a predetermined reference value, and, in the case of a deviation of the potential difference from the reference value which lies within a predetermined threshold value, the magnetic field for determining flow is operated with at least a second clocking, reduced compared to the first clocking.

11 Claims, 2 Drawing Sheets

(56) References Cited

U.S. PATENT DOCUMENTS

| | | |
|---|---|---|
| 2002/0117009 A1 | 8/2002 | Keech |
| 2003/0005778 A1 | 1/2003 | Budmiger |
| 2005/0021248 A1 | 1/2005 | Mitsutake |
| 2010/0271012 A1* | 10/2010 | Patterson et al. ........ 324/207.15 |

FOREIGN PATENT DOCUMENTS

| | | |
|---|---|---|
| EP | 1 079 212 A2 | 2/2001 |
| JP | 03039618 A | 2/1991 |
| JP | 06341874 A | 12/1994 |
| JP | 07306069 A | 11/1995 |

* cited by examiner

METHOD FOR ENERGY-SAVING OPERATION OF A MAGNETO-INDUCTIVE FLOW MEASURING DEVICE

TECHNICAL FIELD

The invention relates to a method for operating a magneto-inductive flow measuring device having a measuring tube.

BACKGROUND DISCUSSION

Magneto-inductive flow measuring devices utilize the principle of electrodynamic induction for measuring volumetric flow, e.g. flow rate: Charge carriers of the medium moved perpendicularly to a magnetic field induce a voltage in electrodes arranged essentially perpendicular to the flow direction of the medium and perpendicular to the direction of the magnetic field. The measurement voltage induced in the electrodes is proportional to the flow velocity of the medium averaged over the cross section of the measuring tube. Thus, the induced voltage is proportional to the volume flow rate. If the density of the medium is known, the mass flow in the pipeline or the measuring tube can be determined. The measurement voltage is usually sensed via the electrode pair, which is arranged in the region of the measuring tube in which the maximum magnetic field strength and thus the maximum measurement voltage is to be expected. The electrodes are usually galvanically coupled with the medium; however magneto-inductive flow measuring devices with contactless, capacitively coupled electrodes are also known.

The measuring tube can be manufactured either from an electrically conductive material, e.g. stainless steel, or from an electrically insulating material. If the measuring tube is manufactured from an electrically conductive material, then the region coming in contact with the medium must be lined with a liner of an electrically insulating material. The liner is composed, for example, of a thermoplastic, a thermosetting plastic or an elastomeric synthetic material, depending on temperature and medium. However, magneto-inductive flow measuring devices with a ceramic lining are also known.

If no voltage supply is available, field devices are often battery operated. This enables an autarkic use of the corresponding field devices. Magneto-inductive flow measuring devices especially can be operated in this way maintenance free for a number of years.

With the application of measuring electrodes contacting the medium, there form, at the interface between the metal measuring electrode and the medium flowing through the measuring tube, galvanic elements, which result in an electrochemical disturbance potential. This electrochemical disturbance potential is variable and dependent on different changing environmental conditions such as temperature, pressure, composition of the medium, material of the measuring electrodes and material of the measuring tube. Thus for example, the composition of the surface of the measuring electrodes can change as a result of the forming of a passivating layer or as a result of corrosion. The varying electrochemical disturbance potential, which is proportional to the flow velocity of the medium flowing through the measuring tube, is superimposed on the actual measurement voltage. It goes without saying that an electrochemical potential changing over time negatively influences the accuracy of measurement of a conventional magneto-inductive flow measuring device. Methods have become known which eliminate these disturbance signals. It is especially critical, when the medium to be measured is a medium with a small conductivity that flows through the measuring tube with a relatively high flow velocity. Due to the influence of the relatively large disturbance voltage on the measurement voltage, the danger is, then, that the measurement voltage disappears in the noise and a reliable and repeatable flow measurement becomes impossible.

The flow proportional measurement voltage of the electrodes amounts to a few mV, possibly only a few μN in the case of very low flow velocity. The electrochemical disturbing voltages, which occur at the interface between electrode and liquid, are superimposed on the flow proportional measurement voltage, as already mentioned. The electrochemical disturbance voltage is a direct voltage, which is applied between the measuring electrodes. This disturbance direct voltage can be more than 100 mV and is some orders of magnitude greater than the flow proportional measurement voltage to be evaluated. Additionally, grid frequency disturbing voltages are superimposed frequently on the measurement voltage.

In order to differentiate the disturbance direct voltage from the signal voltage, targeted time dependent modulation of the magnetic field, thus the electrical current which flows through the coils of the magneto-inductive flow measuring device exciting the magnetic field, is necessary.

At a magnetic field strength $B=0$, the measurement voltage $U$ is equal to zero. If one increases the electrical current through the coils, the strength of the magnetic field $B$ rises and correspondingly the measurement voltage $U$ also rises. In the case of a reversal of the coil current, thus an reversed magnetic field $B$, $U$ likewise changes sign. This effect is applied, in order to separate the measurement voltage from the electrochemical disturbance, direct voltage.

Of all the components of a magneto-inductive flow measuring device, the coil arrangement for producing the magnetic field B passing through the measured material has the largest energy requirement.

SUMMARY OF THE INVENTION

Therefore, an object of the invention is to provide an energy saving method for operating a magneto-inductive flow measuring device.

According to the invention, this object is achieved by features including that: An at least partially electrically-conductive, measured material flows through the measuring tube, wherein, for determining flow, there is produced by means of at least one coil arrangement a clocked magnetic field, which at least partially passes through the measured material, wherein the magnetic field is produced by an exciter current which flows through the coil arrangement, wherein the magnetic field is operated with at least a first clocking, wherein, when the coil arrangement is free of exciter current, an electrical potential difference between the measured material and a reference potential is sensed by means of at least a first measuring electrode communicating with the measured material, wherein the potential difference is compared with a predetermined reference value, and, in the case of a deviation of the potential difference from the reference value lying within a predetermined threshold value, for determining flow, the magnetic field is operated with at least a second clocking, reduced compared to the first clocking.

The magnetic field of the magneto-inductive flow measuring device is operated in measurement operation with a first clocking, i.e. the magnetic field is produced periodically by an exciter current applied to the coil arrangement. For such purpose a unipolar exciter current can be used. Alternatively, the polarity of the exciter current can be changed periodically. The clocking of the magnetic field occurs, for example, by essentially trapezoidally shaped voltage or electrical current pulses during a predetermined time interval. During the predetermined time interval, however, the coil arrangement is not continuously flowed through by the exciter current but, instead, is, at times, free of exciter current.

It has been found that the disturbance voltage correlates with the flow, or flow velocity, of the measured material flowing through the measuring tube. Thus, the sensed voltage or potential difference corresponds to the disturbance voltage during times when the coil arrangement is free of the exciter current. This voltage can be sensed and evaluated and/or, in given cases, stored. The disturbance voltage is, in such a case, the potential difference between the first electrode and a reference potential. The reference potential is, in such a case, for example, a second, especially constant potential, which enables a potential difference from the first measuring electrode to be ascertained. After registering the disturbance voltage, this is compared to a reference value.

For the registering of a change of the flow velocity of the measured material or of the flow through the measuring tube, electrodes capacitively coupled to the measured material can also be used. A change of the flow velocity is then indicated by a voltage peak in the measurement signal at the time when the coil arrangement is free of exciter current.

The potential difference sensed during one of the times in the clocking when the coil arrangement is free of exciter current is compared to a reference value. The reference value is, for example, a furnished, especially a stored, value of the potential difference. The deviation of the potential difference from the reference value gives then information about a change of the potential difference. For example, the deviation can be the value of the difference between the sensed potential difference and the reference value. If the deviation exceeds or falls below a predetermined threshold value, this can be interpreted as a change of the flow or the flow velocity of the measured material through the measuring tube. Based on the information concerning the change of the flow or the flow velocity of the measured material, an adapting of the magnetic field clock, or the clocking of the magnetic field, can occur. Then the magneto-inductive flow measuring device is operated with a second clocking dependent on the deviation. As a result of this, more or less voltage or current pulses for the control of the exciter current are produced, for example, per time interval depending on the ascertained deviation of the potential difference from the reference value, than in the case of an operation with the first clocking.

By adapting the clocking of the magnetic field to the flow or to the flow change, energy and therefore costs can be saved. Additionally, for example, the lifetime of a battery operated magneto-inductive flow measuring device is increased due to the achieved energy savings.

In an embodiment, in the case of a deviation of the potential difference from the reference value lying beyond a predetermined threshold value, the flow measuring device is operated for determining flow with at least one clocking increased compared to the first clocking. The threshold value, for example, can be fixed so that only in the case of a constant potential difference is the magnetic field operated with the second clocking. In such a case, any deviation of the potential difference from the reference value is evaluated as an exceeding of the threshold value.

In an additional embodiment of the method, the reference value is determined by a value, especially a furnished value, of the potential difference between the first measuring electrode and the reference potential. In this regard, for example, a value of the potential difference is stored and can, thus, be compared with a value of the potential difference at a later point in time. In such case, the potential difference is sensed when the coil arrangement is free of exciter current. Based on the change of the potential difference measured during the times of the clocking, with which the magnetic field is operated, when the coil is free of exciter current, the clocking of the magnetic field is changed.

In an additional embodiment, in a case where the deviation of the potential difference from the reference value reaches or goes beyond the threshold value, the magnetic field is operated with at least a third clocking for determining flow. In this embodiment, the magnetic field is operated with a second clocking during a process phase in which the flow does not change or changes only insignificantly. In the case of a change of the potential difference going beyond the predetermined threshold value, the magnetic field is then operated with a third clocking, in order to ascertain a change in the flow, or in the flow velocity, with increased accuracy and precision.

In a form of embodiment of the method of the invention, a clocked direct field is used as magnetic field. This means that the magnetic field is produced by means of a clocked direct current. In such a case, for example, the poles of the magnetic field are periodically reversed, so that the measurement voltages at the measuring electrodes follow one another with reversed sign. The registered measurement voltages are then averaged for forming the measured value. Disturbing voltages can thus be eliminated computationally. Of advantage in the case of such a magneto-inductive flow measuring device operated with a clocked magnetic field is that the clocking, i.e. the pulse density per time interval, with which the magnetic field is produced, can be reduced, especially in the case of flow that remains constant. Usually, electrical energy accumulates in at least one capacitor for producing a magnetic field pulse and a defined electrical current pulse corresponding to a predetermined clocking is transmitted into the coil arrangement. Depending on the pulse density of the predetermined clocking, a shorter or longer time span is available for the electrical energy to accumulate, so that also the magnetic field strength produced by the exciter current can be dependent on the clocking used. The measurement voltage induced in the measured material depends, however, on the produced magnetic field strength. With a stronger magnetic field, the accuracy of measurement of the flow measuring device consequently also increases.

In an additional embodiment of the method, an alternating field is used as the magnetic field. In the method of the alternating field excitation, the coil arrangement is directly excited by the electrical current grid with a sinusoidal, grid, alternating voltage (e.g.: 50 Hz). The measuring and disturbing voltages can be well isolated from one another by the magnetic field produced by the grid alternating voltage.

Also, in the case of an excitation of the magnetic field by the grid frequency, alternating electrical current, the energy requirement of the measuring device can be reduced with the proposed method, since in comparison to the known state of the art measurement operation, the proposed method can measure with a smaller clocking and thus a smaller energy requirement, without that changes in the flow go undetected.

In an embodiment, in the case of a deviation of the potential difference from the reference value still within a predetermined threshold value, the coil arrangement remains free of a magnetic field producing, exciter current until the deviation between the sensed potential difference and the reference value reaches or goes beyond the predetermined threshold value. In this case, during operation with the second clocking, no voltage or electrical current pulses are transmitted to the coil arrangement to produce a magnetic field. The coil arrangement remains, as a result, free of exciter current until the deviation of the potential difference from the reference value reaches or goes beyond a predetermined threshold value. Through this embodiment of the method, the magnetic field is produced for measurement purposes only in the case of a deviation of the potential difference from the reference value beyond a predetermined threshold value.

In an additional embodiment the magnetic field is turned on and/or the sampling rate of the first, second and/or third clocking is increased in the case of a deviation of the potential difference, which is beyond the predetermined threshold value. The clocking of the magnetic field, or of the exciter current flowing through the coil arrangement, is increased in the case of a change of the potential difference that is beyond the threshold value, in order to ascertain a change of the flow indicated by the deviation.

In an additional embodiment, the magnetic field and/or the first, second and/or third clocking and/or the strength of the magnetic field are/is controlled as a function of the electrical potential difference or the deviation from the reference value. By means of an increase of the clocking of the magnetic field, changes in the flow or the flow velocity can be registered faster. And, with an increase of the magnetic field strength, the flow can be determined more exactly. In this embodiment, the strength and the clocking of the magnetic field are accordingly deviation dependent.

In an additional embodiment, the first measuring electrode is placed in a first section of the measuring tube, and the reference potential is ascertained by means of a second measuring electrode placed in a second section of the measuring tube lying especially essentially diametrally opposite the first measuring electrode. A further electrode can be introduced into the wall of the measuring tube for reference, grounding and/or monitoring purposes. The measuring electrodes can be composed, in such a case, of, for example, stainless steel, Hastelloy®, tantalum or platinum/rhodium or can be coated with one of these materials. Capacitive plate electrodes are also an option.

In an additional embodiment, the first and/or second measuring electrode come(s) in contact with the measured material. Through the wetting of the surface of the measuring electrodes by the measured material, electrochemical disturbance potentials form on their surfaces that permit an inference of the flow velocity of the measured material also in the case of an absence of a magnetic field produced by the coil arrangement. If capacitive electrodes are used, then a change in the flow can be noticed in the sensed measurement signal by a voltage peak transmitted by induction.

In an additional embodiment, a flow measuring device constructed as a two-conductor-measuring device is used. Above all, two-conductor-measuring devices, which, through their construction, make use of only a low energy supply can be operated advantageously with the method of the invention.

In an additional embodiment, the flow measuring device is fed energy from a battery. In the case of a battery operated magneto-inductive flow measuring device, the energy is limited in amount and is available for a finite amount of time. The method of the invention, among other things, lengthens the lifetime of such a device.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
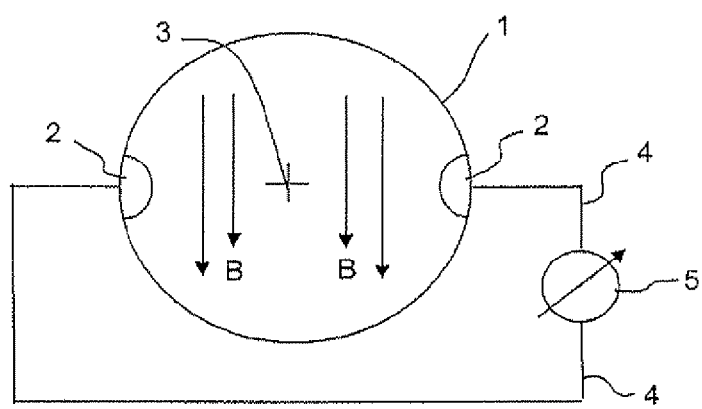
FIG. 1 is a schematic representation of the measuring principle of a magneto-inductive flow measuring device.

FIG. 1 shows, schematically, the operation of a magneto-inductive flow measuring device. A magnetic field B indicated by the arrows extending in the measuring tube passes perpendicularly to the longitudinal axis 3 of the measuring tube 1 through the measuring tube 1 and through the electrically conductive, measured material flowing therein. The magnetic field B is produced, in such a case, by at least one coil arrangement (not shown). Likewise, two measuring electrodes 2 are introduced into the measuring tube 1 aligned diametrally opposite to one another and perpendicular both to the longitudinal axis 3 of the measuring tube 1 and to the magnetic field lines indicated by the arrows. In this case, the measuring electrodes 1 are in contact with the measured material. Corresponding to the law of induction, a measurement voltage $U_{flow}$ is induced in the measured material by the magnetic field B. The induced voltage is proportional to the average velocity v of the measured material flowing through the measuring tube 1 of diameter d. The induced voltage is approximately: $U_{flow}$=k B d v.

An electrochemical disturbance voltage forms between the measuring electrodes 2 and the measured material. The disturbance voltage can be up to 100 mV. The potential difference U between the measuring electrodes 2 changes as a function of the flow velocity. The cause therefore lies in the abrasion dependent on the flow velocity, or the deposits on the measuring electrodes 2 dependent on the flow velocity. In the case of a change of the flow velocity, consequently, the electrical potential on the measuring electrodes 2, or between the first measuring electrode and the reference potential, changes. For ascertaining the potential difference U existing between the measuring electrodes 2, a voltage meter 5, for example in the form of a correspondingly connected operational amplifier, is used. The electrical potential difference U between the measuring electrodes 2 can be sensed especially during the absence of the magnetic field B produced by the coil arrangement. The voltage meter 5 is connected to the measuring electrodes 2 by electrical connecting lines 4. Furthermore, changes of the electrical potential difference U can be caused through disturbance effects such as, for example, disturbing voltages coupled to the measurement signal, deposits and particles and/or gases entrained in the measured material. For the separation of these different effects influencing the measurement signal, the method known from the publication DE 103 295 40 A1 can be used, for example.

Figure 2:
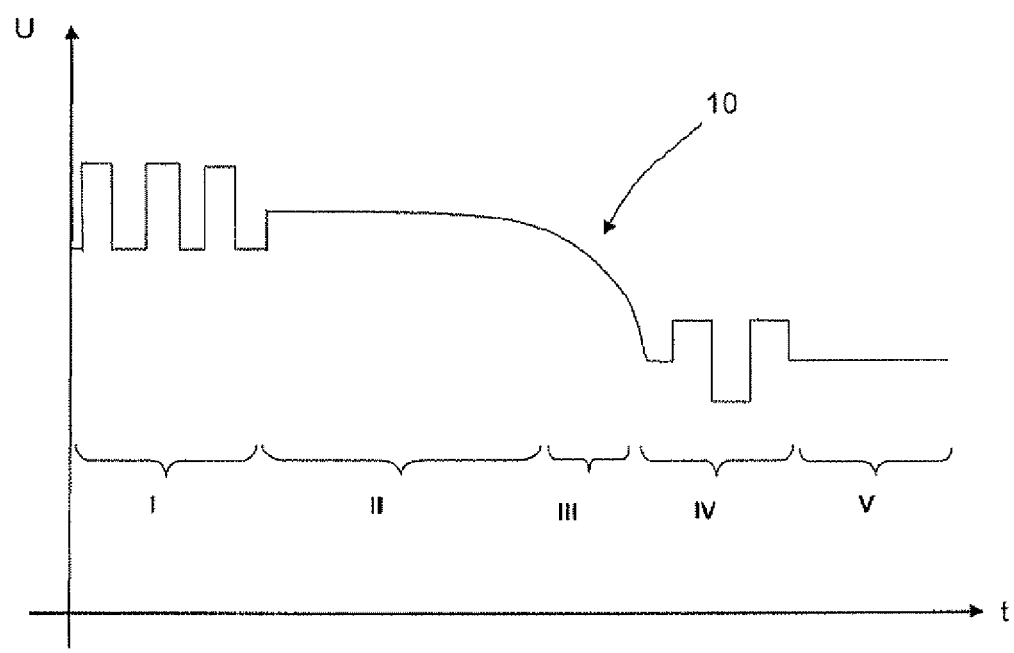
FIG. 2 is a curve of the potential difference in the case of a magneto-inductive flow measuring device operated with a clocked magnetic field.

FIG. 2 shows the idealized time curve of the potential difference U. The potential difference U shown can be sensed between the first measuring electrode 2 and a reference potential, especially a second measuring electrode 2. During the first section I, the flowing measured material is supplied with a clocked magnetic field B. Corresponding to the clocking of the magnetic field B, a voltage is induced in the measured material, in accordance with the law of induction. An essentially rectangular, meandering curve of the induced voltage is detected in the first section I. The rectangular curve form results from the change of the polarity of the induced voltage $U_{flow}$. In such a case, the induced voltage $U_{flow}$ is superimposed on the electrochemical disturbance voltage. The electrochemical disturbance voltage is a direct voltage. During times when the measured material is not supplied with a magnetic field produced by the coil arrangement, the potential difference U between the measuring electrodes 2 essentially corresponds to the electrochemical disturbance voltage. In section I, 2.5 periods are visible, during which an electrical voltage $U_{flow}$ is induced in the measured material for determining flow through the measuring tube 1. The voltage $U_{flow}$ induced in the measured material and, thus, the flow through the measuring tube 1, remains constant in section I. The magnetic field B for determining the flow is then switched off. In section II, the potential difference U remains constant with the magnetic field B turned off. An operation of the flow measuring device in section II is also possible with a reduced, second clocking (not shown). A change 10 of the potential difference U occurs in section III, whereupon the magnetic field B is turned back on in section IV and is operated with a third clocking. After two measurement periods with the third clocking, the magnetic field B is switched back off. The potential difference U remains constant through section V, during which time, the magnetic field remains turned off.

Figure 3:
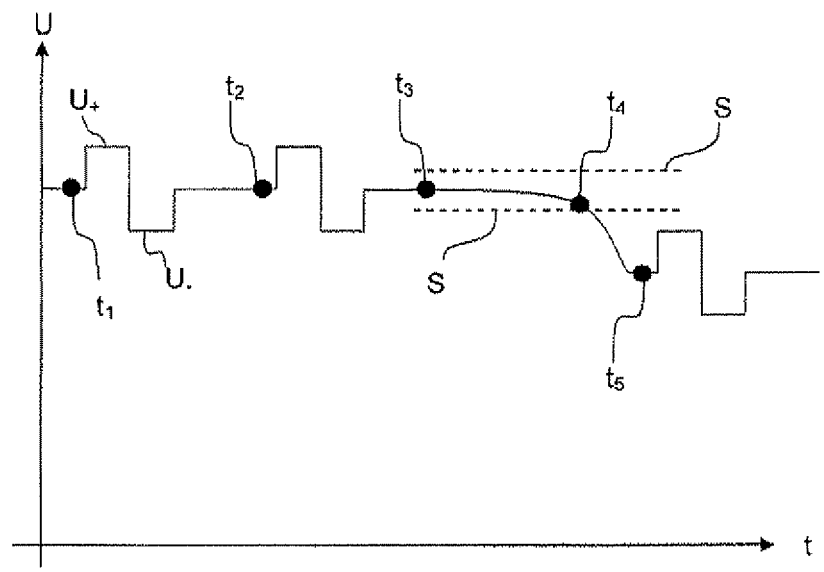
FIG. 3 is a curve of the potential difference, in the case of a magneto-inductive flow measuring device operated with a full field.

FIG. 3 shows the curve of the potential difference in the case of clocked magnetic field B, wherein the polarity of the magnetic field B is reversed over the course of one period. During one period, for determining a voltage $U_{flow}$ induced in the measured material by the magnetic field B, the polarity of the potential difference changes depending on the polarity of the magnetic field B. The magnetic field B is periodically reversed, so that two measurement voltages $U_+$, $U_-$, with reversed sign arise following one another on the measuring electrodes 2. The averaged difference of both measured values corresponds to the induced voltage $U_{flow}$, thua $$U_{flow} = \frac{U_+ - U_-}{2}.$$

In such case, magnetic field free times are provided between the times of the clocking in which a magnetic field is produced for determining the flow. Before a measurement, the potential difference U is sensed for determining the electrochemical disturbance voltage. At these points in time $t_1$, $t_2$, $t_5$ the coil arrangement is free of the exciter current that produces the magnetic field B. If the ascertained potential difference U remains within the predetermined threshold values S and the induced voltage $U_+$, $U_-$ in the measured material essentially equal, then the magnetic field B can be turned off and only the electrochemical disturbance voltage is monitored for the purpose of determining the flow. At the point in time $t_4$ of the fourth measurement, the deviation of the potential difference U from the reference value is still within the threshold values S and no active measuring of the flow occurs by the production of a magnetic field passing through the measured material. At point in time $t_5$ the deviation lies outside of the predetermined threshold values S and a magnetic field B is produced with a third clocking.

Figure 4:
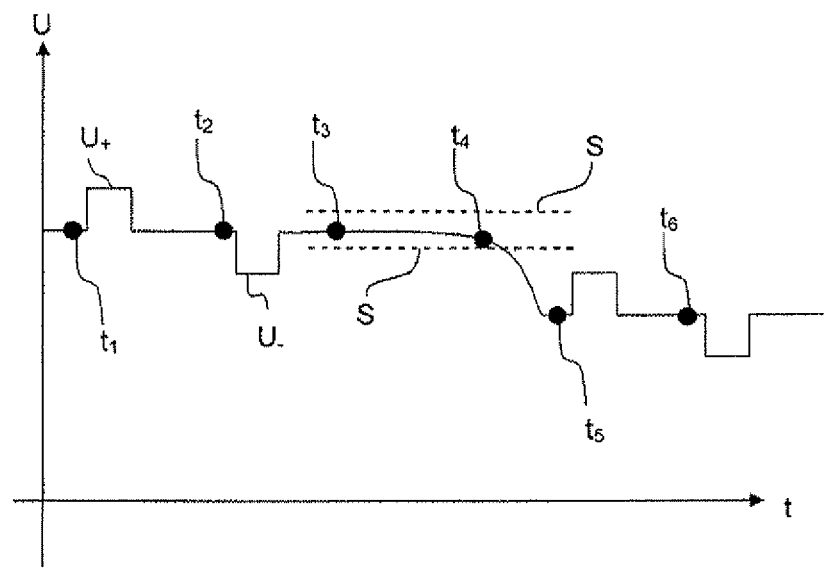
FIG. 4 is a curve of the potential difference in the case of a half field per measurement.

In FIG. 4, measuring of the flow is performed by means of a so-called half field. For such a purpose, in contrast to a full field measurement in which the polarity of the magnetic field B is directly reversed, the polarity of the magnetic field B is maintained during a measurement and is first reversed in the following measurement. A measured value is determined, in such a case, after at least two measurements by averaging the voltage $U_{flow}$ induced during the measurements. In such a case, the potential difference U at the points in time $t_1$, $t_2$, $t_3$, $t_4$, $t_5$, $t_6$ is measured before an induction of the magnetic field by the exciter current in order to detect whether a change in the flow has taken place. Depending on this measured potential difference U, a magnetic field B is produced and, in given cases, the clocking is reduced. In the case of the potential curve shown in FIG. 4, the magnetic field B remains switched off after detecting an unchanged potential difference U for the point in time $t_3$ compared to the point in time $t_1$ and/or $t_2$, until directly after point in time $t_5$, at which it is detected that the potential difference U has gone beyond a threshold value S.

The invention claimed is:

1. A method for operating a magneto-inductive flow measuring device having a measuring tube, comprising the steps of:
   providing an at least partially electrically-conductive measured material to flow through the measuring tube;
   producing by means of at least one coil arrangement a clocked magnetic field for determining flow, which passes at least partially through the measured material, and wherein the magnetic field is produced by an exciter current, which flows through the coil arrangement;
   operating the magnetic field with at least a first clocking, wherein in a case, in which the coil arrangement is free of exciter current, an electrical potential difference is sensed between the measured material and a reference potential by means of at least a first measuring electrode communicating with the measured material;
   comparing the potential difference with a predetermined reference value; and
   operating the magnetic field, in the case of a deviation of the potential difference from the reference value lying within a predetermined threshold value, for determining flow, with at least a second clocking, reduced compared to the first clocking, wherein:
   the reference value is determined from a value, especially a furnished value, of the potential difference between the first measuring electrode and the reference potential.

2. The method as claimed in claim 1, wherein:
   a clocked direct field is used as the magnetic field.

3. The method as claimed in claim 1, wherein:
   an alternating field is used as the magnetic field.

4. The method as claimed in claim 1, wherein:
   the first and/or second measuring electrode come(s) in contact with the measured material.

5. The method as claimed in claim 1, wherein:
   a flow measuring device embodied as a two-conductor measuring device is applied.

6. The method as claimed in claim 1, wherein:
   the flow measuring device is fed energy from a battery.

7. A method for operating a magneto-inductive flow measuring device having a measuring tube, comprising the steps of:
   providing an at least partially electrically-conductive measured material to flow through the measuring tube;
   producing by means of at least one coil arrangement a clocked magnetic field for determining flow, which passes at least partially through the measured material, and wherein the magnetic field is produced by an exciter current, which flows through the coil arrangement;
   operating the magnetic field with at least a first clocking, wherein in a case, in which the coil arrangement is free of exciter current, an electrical potential difference is sensed between the measured material and a reference potential by means of at least a first measuring electrode communicating with the measured material;

comparing the potential difference with a predetermined reference value; and operating the magnetic field, in the case of a deviation of the potential difference from the reference value lying within a predetermined threshold value, for determining flow, with at least a second clocking, reduced compared to the first clocking, wherein:

in the case of a deviation of the potential difference from the reference value reaching or beyond the threshold value, for determining flow, the magnetic field is operated with at least a third clocking.

8. A method for operating a magneto-inductive flow measuring device having a measuring tube, comprising the steps of:

providing an at least partially electrically-conductive measured material to flow through the measuring tube;

producing by means of at least one coil arrangement a clocked magnetic field for determining flow, which passes at least partially through the measured material, and wherein the magnetic field is produced by an exciter current, which flows through the coil arrangement;

operating the magnetic field with at least a first clocking, wherein in a case, in which the coil arrangement is free of exciter current, an electrical potential difference is sensed between the measured material and a reference potential by means of at least a first measuring electrode communicating with the measured material;

comparing the potential difference with a predetermined reference value; and operating the magnetic field, in the case of a deviation of the potential difference from the reference value lying within a predetermined threshold value, for determining flow, with at least a second clocking, reduced compared to the first clocking, wherein:

in the case of a deviation of the potential difference from the reference value lying within a predetermined threshold value, the coil arrangement remains free of an exciter current producing the magnetic field, until the deviation between the sensed potential difference and the reference value reaches or goes beyond the predetermined threshold value.

9. A method for operating a magneto-inductive flow measuring device having a measuring tube, comprising the steps of:

providing an at least partially electrically-conductive measured material to flow through the measuring tube;

producing by means of at least one coil arrangement a clocked magnetic field for determining flow, which passes at least partially through the measured material, and wherein the magnetic field is produced by an exciter current, which flows through the coil arrangement;

operating the magnetic field with at least a first clocking, wherein in a case, in which the coil arrangement is free of exciter current, an electrical potential difference is sensed between the measured material and a reference potential by means of at least a first measuring electrode communicating with the measured material;

comparing the potential difference with a predetermined reference value; and operating the magnetic field, in the case of a deviation of the potential difference from the reference value lying within a predetermined threshold value, for determining flow, with at least a second clocking, reduced compared to the first clocking, wherein:

in the case of a deviation of the potential difference beyond the predetermined threshold value, the magnetic field is turned on and/or the sampling rate of the first, second and/or third clocking is increased.

10. A method for operating a magneto-inductive flow measuring device having a measuring tube, comprising the steps of:

providing an at least partially electrically-conductive measured material to flow through the measuring tube;

producing by means of at least one coil arrangement a clocked magnetic field for determining flow, which passes at least partially through the measured material, and wherein the magnetic field is produced by an exciter current, which flows through the coil arrangement;

operating the magnetic field with at least a first clocking, wherein in a case, in which the coil arrangement is free of exciter current, an electrical potential difference is sensed between the measured material and a reference potential by means of at least a first measuring electrode communicating with the measured material;

comparing the potential difference with a predetermined reference value; and operating the magnetic field, in the case of a deviation of the potential difference from the reference value lying within a predetermined threshold value, for determining flow, with at least a second clocking, reduced compared to the first clocking, wherein:

the magnetic field and/or the first, second and/or third clocking and/or the strength of the magnetic field is controlled as a function of the electrical potential difference or the deviation from the reference value.

11. A method for operating a magneto-inductive flow measuring device having a measuring tube, comprising the steps of:

providing an at least partially electrically-conductive measured material to flow through the measuring tube;

producing by means of at least one coil arrangement a clocked magnetic field for determining flow, which passes at least partially through the measured material, and wherein the magnetic field is produced by an exciter current, which flows through the coil arrangement;

operating the magnetic field with at least a first clocking, wherein in a case, in which the coil arrangement is free of exciter current, an electrical potential difference is sensed between the measured material and a reference potential by means of at least a first measuring electrode communicating with the measured material;

comparing the potential difference with a predetermined reference value; and operating the magnetic field, in the case of a deviation of the potential difference from the reference value lying within a predetermined threshold value, for determining flow, with at least a second clocking, reduced compared to the first clocking, wherein:

the first measuring electrode is placed in a first section of the measuring tube; and by means of a second measuring electrode placed in a second section of the measuring tube, especially essentially lying diametrally opposite the first measuring electrode, the reference potential is ascertained.

* * * * *